J. DOBBS & B. F. BOOTH.
BARBED FENCE-WIRE.

No. 171,105. Patented Dec. 14, 1875.

WITNESSES
H. Bates
Francis J. Classi
By

INVENTORS
John Dobbs
Benjamin F. Booth
Chipman Hosmer & Co
Attorneys.

N. PETERS, PHOTO-LITHOGRAPHER, WASHINGTON, D. C.

UNITED STATES PATENT OFFICE.

JOHN DOBBS AND BENJAMIN F. BOOTH, OF VICTOR, IOWA.

IMPROVEMENT IN BARBED FENCE-WIRES.

Specification forming part of Letters Patent No. 171,105, dated December 14, 1875; application filed August 7, 1875.

*To all whom it may concern:*

Be it known that we, JOHN DOBBS and BENJAMIN F. BOOTH, both of Victor, in the county of Iowa and State of Iowa, have invented a new and valuable Improvement in Barbed Fence-Wires; and we do hereby declare that the following is a full, clear, and exact description of the construction and operation of the same, reference being had to the annexed drawings, making a part of this specification, and to the letters and figures of reference marked thereon.

Figure 1:
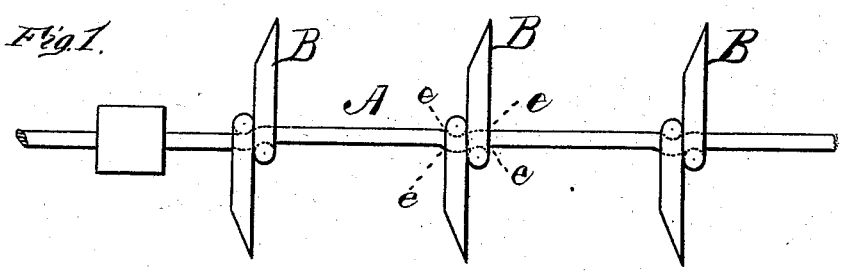
Figure 2:
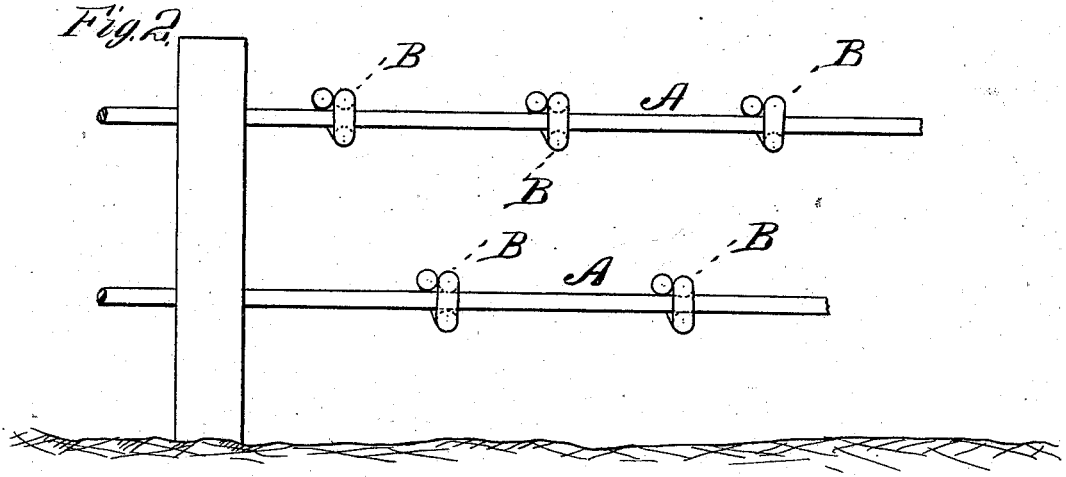
Figure 3:
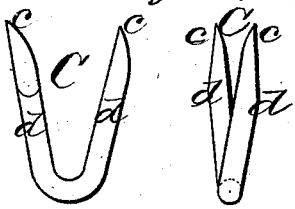
Figure 4:
Figure 5:

Figure 1 of the drawings is a representation of a plan view of a section of our barbed fence, and Fig. 2 is a front view of the same. Figs. 3, 4, and 5 are detail views of the barbs.

This invention has relation to improvements in barbs for wire-fences. The object of the invention is to devise a barb, which may be readily and expeditiously applied upon the wires of an existing wire-fence, for the purpose of keeping off cattle and other animals, and thus preventing the fence from being broken down or otherwise injured. The nature of the invention consists in a wire-fence barb formed out of a U-shaped metallic blank by placing it upon the wire, bending its legs in opposite directions across the same, and then clamping it thereon, whereby the wire will be bent obliquely to its length, forming two shoulders, thereby holding the barb against all displacement, as will be hereinafter more fully explained and claimed.

In the annexed drawings, A designates a section of a wire in a fence, in connection with which we propose to illustrate our invention. Upon this wire are placed, at suitable intervals, barbs B, which project inward and outward from the said wire, and which serve to prevent domestic animals from rubbing against and breaking down the fence and escaping from the inclosure. These barbs are formed out of a U-shaped blank, C, which is preferably of round wire, and is provided with penetrating-points $c$ at each end of its legs $d$, which latter are spread out laterally from each other, as shown in Fig. 3 in different planes. To attach barbs B to the wire, the blanks are placed astraddle thereon at suitable intervals apart, and their legs $d$ are simultaneously bent in opposite directions across the wire by means of a clamp, causing the blank to be looped around and rigidly secured on the said wire, as shown in Figs. 1 and 2. At the same time that the blank is attached to the wire that portion of the latter inclosed in the loop of the former will be bent obliquely to its length, thus forming at each side of the said loop a shoulder, $e$, by means of which the barb will be prevented from both lateral and axial displacement.

The clamp by means of which the results above mentioned are simultaneously produced, forming as it does the subject-matter of a separate application now pending for Letters Patent of the United States, an extended description thereof is not herein deemed necessary.

We are aware that an improvement in barbed-wire fences, in which a single wire provided at intervals with spiral twists, into which barbs are spirally intertwisted, having their ends turned outward at right angles to the fence, has heretofore been employed; and we therefore lay no claim to such invention.

What we claim as new, and desire to secure by Letters Patent, is—

The wire A, having a shoulder, $e$, formed on each of its sides, and opposite each other, in combination with the barb B, with its legs spread laterally, and clamped to the wire at its shoulders, in the manner described.

In testimony that we claim the above we have hereunto subscribed our names in the presence of two witnesses.

JOHN DOBBS.
BENJ. F. BOOTH.

Witnesses to DOBBS's signature:
HARRY HOWARD,
J. B. CARY.

Witnesses to BOOTH's signature:
GEORGE E. UPHAM,
WALTER C. MASI.